United States Patent
Skinner et al.

(10) Patent No.: US 6,934,455 B2
(45) Date of Patent: Aug. 23, 2005

(54) WAVEGUIDES WITH OPTICAL MONITORING

(75) Inventors: Michael Skinner, San Jose, CA (US); Bidhan Chaudhuri, San Jose, CA (US); Chan Yoo, Morgan Hill, CA (US); Mahmood Toofan, Milpitas, CA (US); Gabel Chong, Mountain View, CA (US); Achintya Bhowmik, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 215 days.

(21) Appl. No.: 10/329,252

(22) Filed: Dec. 24, 2002

(65) Prior Publication Data

US 2004/0120675 A1 Jun. 24, 2004

(51) Int. Cl.[7] .............................................. G02B 6/10
(52) U.S. Cl. .................... 385/129; 385/130; 385/131
(58) Field of Search ................................ 385/129, 130, 385/131, 14

(56) References Cited

U.S. PATENT DOCUMENTS

| | | | | | |
|---|---|---|---|---|---|
| 4,893,162 | A | * | 1/1990 | Gentner et al. ............. | 257/189 |
| 5,170,448 | A | * | 12/1992 | Ackley et al. ................ | 385/31 |
| 5,764,832 | A | * | 6/1998 | Tabuchi ........................ | 385/49 |
| 5,771,322 | A | * | 6/1998 | Matsumoto et al. .......... | 385/31 |
| 5,909,524 | A | * | 6/1999 | Tabuchi ........................ | 385/49 |
| 5,999,670 | A | * | 12/1999 | Yoshimura et al. ........... | 385/31 |
| 6,567,590 | B1 | * | 5/2003 | Okada et al. ................. | 385/49 |
| 2002/0085785 | A1 | * | 7/2002 | Kishimoto et al. ........... | 385/14 |
| 2002/0097962 | A1 | * | 7/2002 | Yoshimura et al. ........... | 385/50 |

FOREIGN PATENT DOCUMENTS

| JP | 63191111 | * | 8/1988 | ...................... 6/42 |
|---|---|---|---|---|
| JP | 1082925 | * | 9/1996 | ...................... 6/26 |

* cited by examiner

*Primary Examiner*—K. Cyrus Kianni
(74) *Attorney, Agent, or Firm*—Marshall, Gerstein & Borun LLP

(57) ABSTRACT

Optical waveguides with power monitoring or optical detection capabilities are disclosed. The waveguide includes a lower cladding, a core disposed on the lower cladding, an upper cladding disposed on the core and a trench extending transversely through a distal end of the lower cladding, core and upper cladding. The trench includes a distal wall that provides a reflective surface disposed at an angle relative to the end of the core of greater than 90°. A detector is disposed above the trench for receiving a reflected light beam off of the reflective surface. Various methods of manufacturing these devices are also disclosed.

41 Claims, 6 Drawing Sheets

WAVEGUIDES WITH OPTICAL MONITORING

BACKGROUND

1. Technical Field

Waveguides with integrated optical monitoring or detectors are disclosed. Further, methods of manufacturing waveguides with optical monitoring means are also disclosed. The waveguides may be used in variable optical attenuators, arrayed waveguide gratings, evanescent couplers and other photonics architectures.

2. Description of the Related Art

There is a wide-ranging demand for increased communications capabilities, including more channels and greater bandwidth per channel. The needs range from long distance applications such as telecommunications between two cities to extremely short range applications such as the data-communications between two functional blocks (fubs) in a semiconductor circuit with spacing of a hundred microns.

Optical media, such as optical fibers or waveguides, provide an economical and higher bandwidth alternative to electrical conductors for communications. A typical optical fiber includes a silica core, a silica cladding, and a protective coating. The refractive index of the core is higher than the refractive index of the cladding to promote internal reflection of light propagating down the silica core.

Optical fibers can carry information encoded as optical pulses over long distances. The advantages of optical media include vastly increased data rates, lower transmission losses, lower basic cost of materials, smaller cable sizes, and almost complete immunity from stray electrical fields. Other applications for optical fibers include guiding light to awkward places (e.g., surgical applications), image guiding for remote viewing, and various sensing applications.

The use of optical waveguides in circuitry to replace conductors isolates path length affects (e.g., delays) from electrical issues such as mutual impedance. As a result, optical interconnects and optical clocks are two applications for waveguide technology. Like optical fibers, waveguides include a higher refractive index core embedded in a lower refractive index cladding.

Wavelength Division Multiplexing (WDM) represents an efficient way to make use of the capacity of an optical fiber. In WDM, a number of independent transmitter-receiver pairs use the same fiber.

WDM utilizes a system comprising a plurality of parallel transmitter-receiver pairs. Each of the information sources modulates one of the optical transmitters, each of which produces light at a different wavelength. The modulation bandwidth of each source is narrower than the separation between the wavelengths, resulting in a spectra of the modulated signals which do not overlap. The signals produced by the transmitters are combined into one optical fiber of in a WDM multiplexer, which is an optical, and often passive component. At an opposite end of the optical fiber, a WDM demultiplexer, also an optical and often passive component separates the different spectral components of the combined signal from each other. Each of these separated signals is detected by a different receiver. Thus, each signal is assigned a narrow wavelength window in a specific wavelength range.

An arrayed waveguide grating (AWG) is a component used in fiber optics systems employing WDM. The various elements of an AWG are normally integrated onto a single substrate. An AWG comprises a plurality of optical input/output waveguides on both sides of the substrate, two slab waveguides, and a grating that consists of channel waveguides that connect the slab waveguides together, which in turn, connect the input/output guides to the separate channel waveguides. The slab waveguides restrict the propagation of light to the plane perpendicular to the substrate but allow light propagation to both sides of the component. The channel waveguides, on the other hand, prevent light propagation to the sides. The channel waveguides are arranged on a circular arc so that each of them is directed towards a center waveguide of the channel waveguide group or grating on an opposite side of the component.

A constant optical path difference exists between two adjacent channel waveguides in the grating. This path difference is a multiple of the center wavelength used. If light is input from the center input/output waveguide of one side at the center wavelength of the component, the light is distributed to all the waveguides of the grating. As the difference in length of the waveguides is a multiple of the center wavelength, all the waves are in the same phase upon arriving in the output slab waveguide whereupon the light is focused to the center output waveguide. Hence, an AWG focuses different wavelengths to different outputs and the dimensioning of the component determines which wavelengths are focused on which output. Thus, an AWG thus comprises a number of light channels with both focusing characteristics (i.e., a lens) and dispersing characteristics (i.e., the wavelength dependency of the grating).

In an optical communications system, it is often required to adjust the intensity or optical power of the light signals being transmitted. For example, the quality of a signal is determined by the ratio between the intensity of an optical signal and the intensity of noise in the optical signal. This ratio is commonly referred to as the optical signal-to-noise ratio (optical SNR). Therefore, it is often necessary to adjust the intensity of a light signal to increase the optical SNR above a predetermined level.

Moreover, to increase the optical SNR of a wavelength division multiplexed (WDM) signal in an optical communication system, the individual light signals normally must have the same light intensity. However, the intensity of each light signal undesirably varies according to a variation in the output power of the light source generating the light signal and according to variations in the insertion loss of optical components in the optical communication system. Also, an optical amplifier typically has a wavelength dependent gain, which thereby causes the various light signals to have different intensities.

To alleviate this problem, variable optical attenuators (VOA) are typically used to control the intensity of each light signal, and thereby maintain each light signal at the same intensity. Generally, a VOA attenuates, or reduces, the intensity of some of the light signals so that all of the light signals are maintained at the same intensity.

An evanescent coupler is formed with two waveguides disposed together in a substrate and that extend for a coupling distance close to each other, such that the light wave modes passing along each waveguide overlap. The overlap causes some light from one waveguide to pass to the other, and vice versa. The two waveguides in the evanescent coupler separate away from each other outside of the coupling distance.

In the architectures of many photonics devices, such as AWGs, VOAs, optical power monitors, and evanescent couplers, it is desirable to perform optical detection at an upper surface of the planar lightwave circuit (PLC). Accordingly, structures and methods of manufacturing devices that provide optical detection integrated into the structure or component are needed.

BRIEF DESCRIPTION OF THE DRAWINGS

The disclosed devices and methods of fabrication thereof are illustrated more or less diagrammatically in the accompanying drawings, wherein.

It should be understood that the drawings are not necessarily to scale and that the embodiments are illustrated by diagrammatic representations, fragmentary views and graphical representations. In certain instances, details which are not necessary for an understanding of the disclosed devices and methods or which render other details difficult to perceive may have been omitted. It should be understood, of course, that this disclosure is not necessarily limited to the particular embodiments illustrated herein.

DETAILED DESCRIPTION OF THE PRESENTLY PREFERRED EMBODIMENTS

Figure 1:
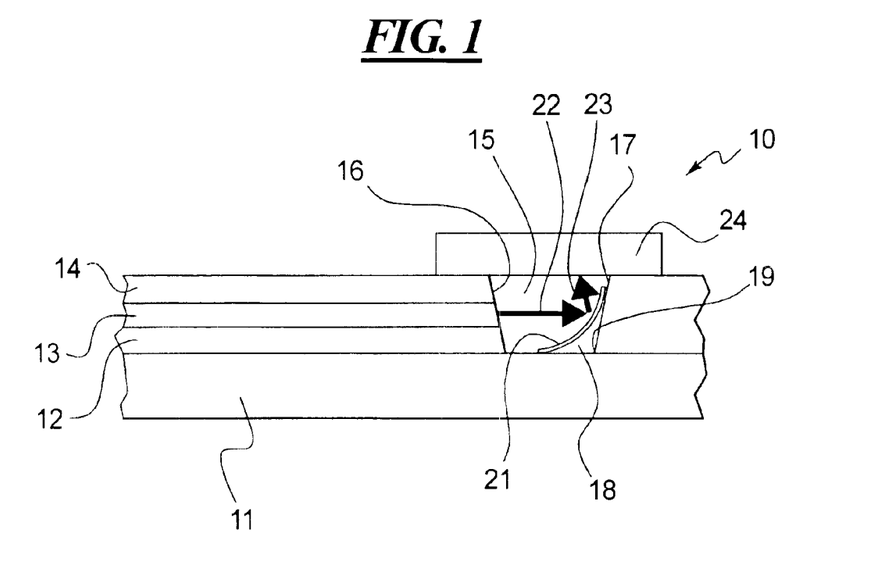
FIG. 1 is a sectional view of a combination waveguide and detector made in accordance with this disclosure.

Turning to FIG. 1, a combination waveguide and detector 10 is shown. The components of the device 10 are mounted to a substrate 11. During fabrication, a lower cladding layer 12 is deposited on the substrate 11 before a core layer 13 is deposited on the lower cladding 12 and an upper cladding layer 14 is deposited on the core layer 13. A trench 15 is etched through the upper cladding 14, core 13 and lower cladding 12.

Figure 3:
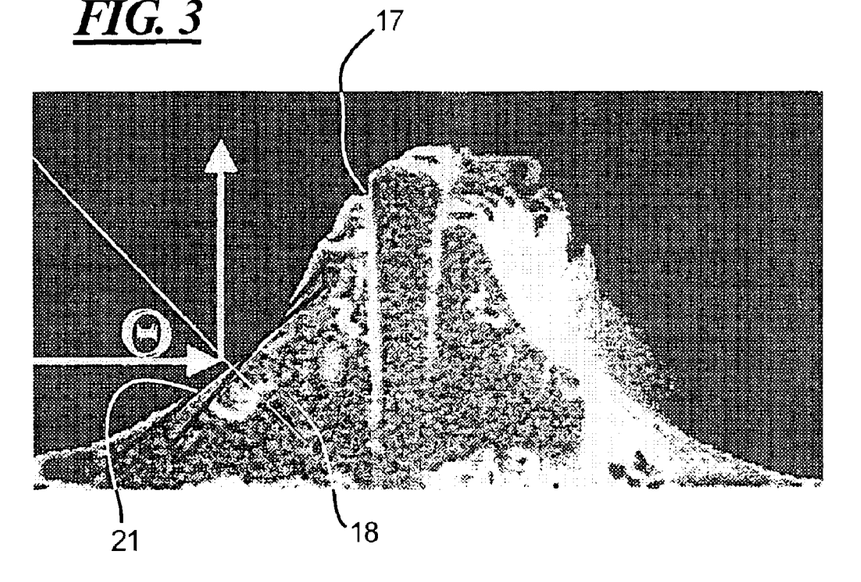
FIG. 3 is a photograph illustrating a concave meniscus formed between the distal wall of a trench and the bottom wall of a trench after the placement of a reflective liquid material, (e.g., epoxy with a high refractive index, an eutectic material, metal solder, etc.) along the distal or far side of a trench opposite the end of the core.

In FIG. 1, the trench 15 includes a proximal wall 16 and a distal wall 17. The walls 16, 17 are preferably non-vertical with respect to the substrate 11. A wet etch process would be used to form non-vertical walls while a dry etch process would be used to form vertical walls. Further, slope to the walls 16, 17 can be provided by combining a dry etch process followed by a reflowing the upper cladding 14 to convert vertical walls to angled or sloped walls. In the embodiment 10 shown in FIG. 1, the walls 16, 17 are formed at approximately 82° with respect to the substrate 11 by way of a wet etch process. However, other non-vertical configurations can be used as well. After formation of the trench 15, reflective material 18 is deposited at or near the junction 19 between the distal wall 17 and the substrate 11. If a liquid material is used for the reflective material 18, a concave meniscus is formed as shown in FIG. 1. Useful reflective materials 18 include epoxies with high refractive indexes, eutectic alloy materials, metal solders, reflow boro-phospho-silicate-glass (BPSG) and others. The meniscus shown in FIGS. 1 and 3 are formed due to surface tension or by way of other surface modification techniques or chemical treatments available to and known to those skilled in the art. As a result, a concave reflective surface 21 is provided.

As a result, a beam transmitted through the core 13 will propagate freely through the trench 15 as shown by the arrow 22 before it strikes the concave reflective surface 21 and is directed upward, as shown by the arrow 23 where it strikes the detector 24. Thus, the component 10 of FIG. 1 is both a waveguide and an optical power monitor. The detector 24 may be a InGaAs detector. One skilled in the art will also appreciate that the detector 24 maybe replaced by an emitter for reflecting light to the core 13. An array of detectors 24, such as an array of InGaAs detectors 24 may be used.

One method for fabricating the component 10 shown in FIG. 1 is as follows. First, the lower cladding 12, core 13 and upper cladding 14 layers are deposited on the substrate 11. The trench 15 is conventionally created using a dry etch process. The sloped walls 16, 17 are created by reflowing the upper cladding after the dry-etching of the trench 15. The reflective surface 21 is deposited after the reflow of the upper cladding 14. Optionally, a passivation layer (not shown) may be deposited on the entire structure prior to installation of the detector 24. The detector 24 may also be installed after the structure is cut to size.

Figure 2:
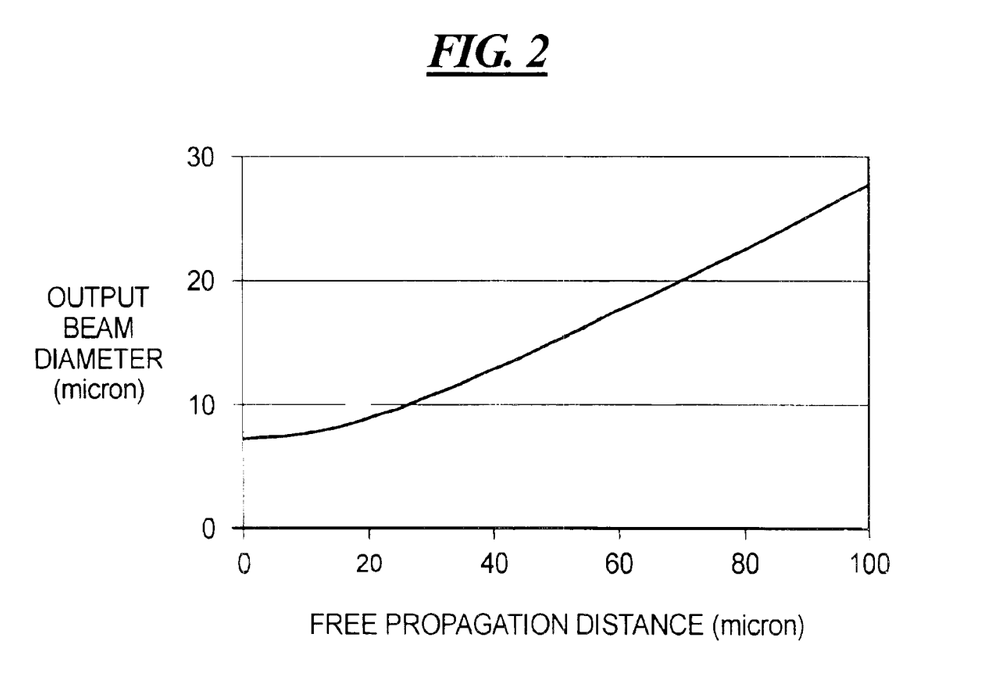
FIG. 2 illustrates, graphically, the output beam diameter as a function of the distance between the end of the core and the reflective surface disposed on the distal wall of the trench, i.e., the free propagation distance, for a single-mode waveguide made in accordance with this disclosure.

FIG. 2 illustrates, graphically, the output beam diameter 22 as a function of the free propagation distance, or the distance between the proximate wall 16 of the trench 15 and the concave reflective surface 21. For example, the diameter of the beam 22 after a propagation distance of about 100 microns is less than 30 microns, which is smaller than the active area of typical photodiodes detectors, which can be used for the detector 24. One advantage to the device 10 shown in FIG. 1 is that it can be manufactured using dry etching to form the trench 15 and no wet acid etch is required. FIG. 3 is a photograph illustrating the meniscus formed which provides the concave reflective surface 21 after liquid reflective material 18 (in the case of epoxies) is deposited along the distal wall 17 of the trench 15 shown in FIG. 1.

Figure 4:
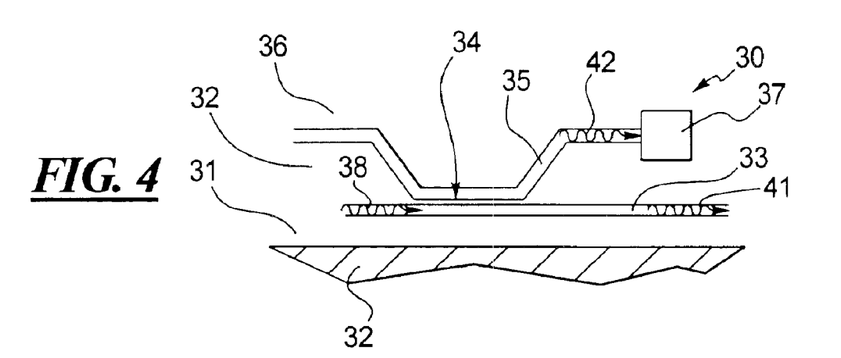
FIG. 4 is sectional view of an evanescent coupler made in accordance with this disclosure.

FIG. 4 illustrates a 10/90 evanescent coupler 30 manufactured in accordance with this disclosure. A cladding 31 is deposited on a substrate 32. A first core 33 is formed between the lower cladding 31 and a middle cladding 32. A trench 34 is then etched in the middle cladding 32 before a second core layer 35 is deposited to form the shaped core 35 as shown in FIG. 4. The trench 34 may be etched using a dry etch process followed by reflow of the middle cladding 32 to provide the sloped proximal and distal walls of the trench 34. Also, the trench 34 may be fabricated using a wet etch process which would eliminate the need for the reflow of the middle cladding 32. Then, an upper cladding 36 is deposited on top of the second core 35. The second core 35 leads to a detector 37. Due to the proximity between the first core 33 and the second core 35 along the bottom of the trench 34, a pulse 38 transmitted through the first core 33 is split into pulses 41, 42 as shown in FIG. 4. The pulse 41 is received at the detector 37 while the pulse 41 proceeds through the first core 33. The pulse 42 is a result of evanescent energy generated in the core 35 as a result of the close proximity of the core 35 to the core 31 at the bottom of the trench 34.

Figure 5:
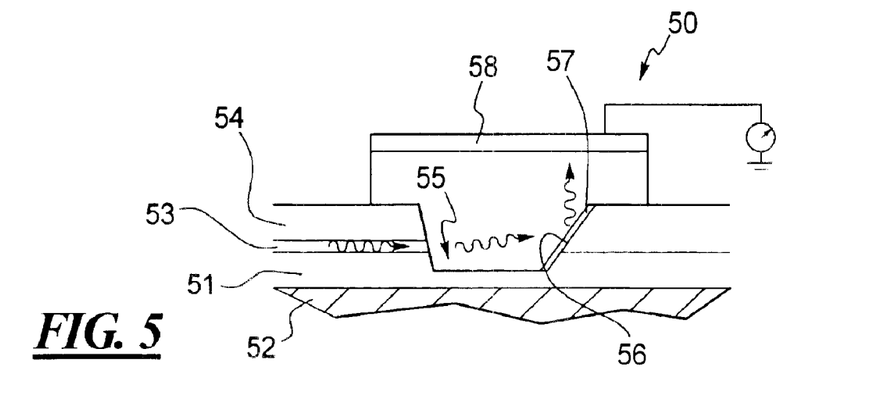
FIG. 5 is a sectional view of another combination waveguide and detector made in accordance with this disclosure.
Figure 6:
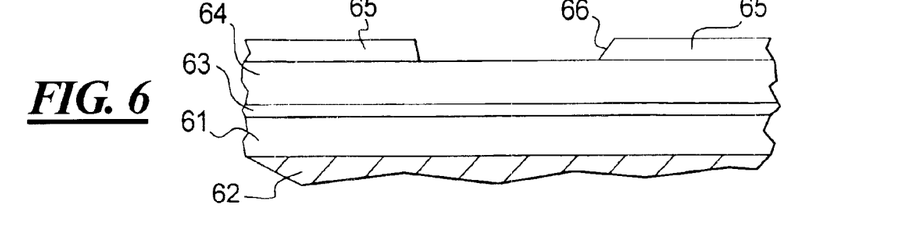
FIGS. 6–11 are sectional views illustrating a process for fabricating a combination waveguide and detector in accordance with this disclosure.
Figure 7:
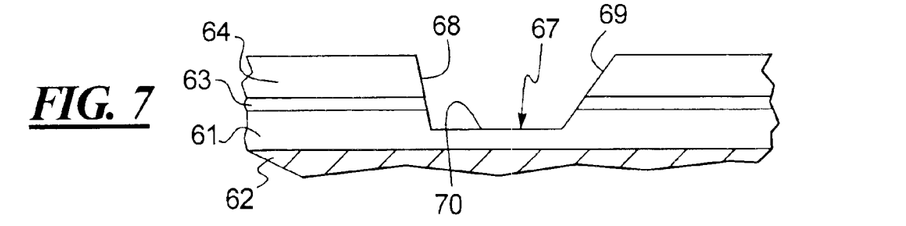

Turning to FIG. 5, another embodiment of a combination waveguide and detector 50 is illustrated. A lower cladding 51 is deposited on the substrate 52. A core 53 is then deposited on the lower cladding 51 before an upper cladding 54 is deposited on the core 53. Similar to the embodiment 10 shown in FIG. 1, a trench 55 is etched into the upper cladding 54, core 53 and lower cladding 51. The distal wall 56 is preferably disposed at an angle with respect to the substrate 52 as shown in FIG. 5. Thus, the combination of a dry etch/reflow or a wet etch process may be utilized. A reflective layer 57 is then applied to the distal wall 56 which, as shown in FIG. 5, reflects the light beam upwards towards the detector 58, or if the detector 58 is replaced by an emitter, as one skilled in the art will recognize, light could be reflected to the core 53.

Figure 8:
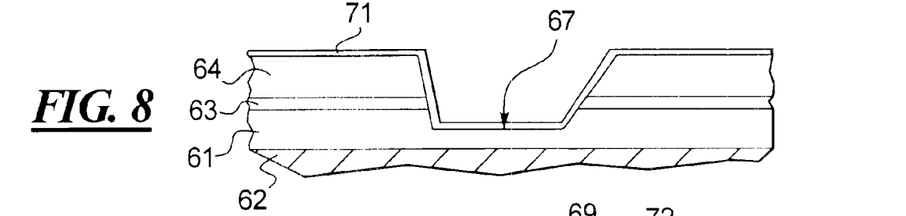
Figure 9:
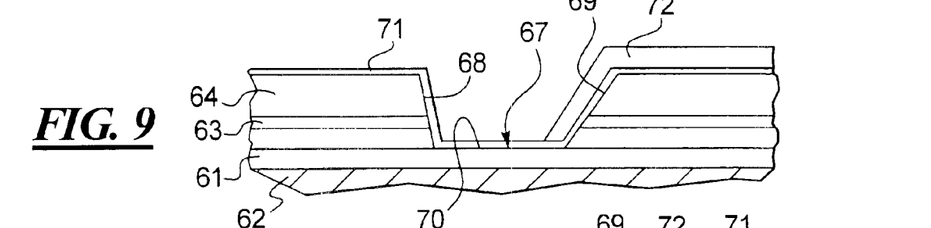

Various methods for fabricating combination waveguides and detectors or optical power monitors are illustrated in FIGS. 6–25. Referring first to FIGS. 6–11, a lower cladding 61 is deposited on a substrate 62. A core layer 63 is deposited on the lower cladding 61 and an upper cladding 64 is deposited on the core 63. A resist pattern 65 is then deposited on the upper cladding 63 with a tapered portion 66. A trench 67 is then formed by dry etching resulting in removal of the resist pattern 65. The trench includes a proximal wall 68, a slanted distal wall 69 and a bottom surface 70. The entire structure is then coated with a layer of metal 71 as shown in FIG. 8. A patterned resist layer 72 is then deposited along a portion of the bottom 70 of the trench 67 and up the distal wall 69 as shown in FIG. 9.

Figure 10:
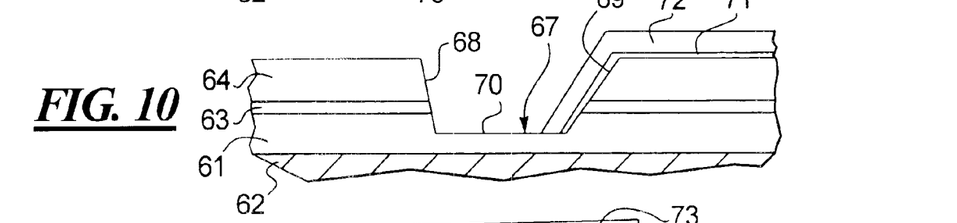
Figure 11:
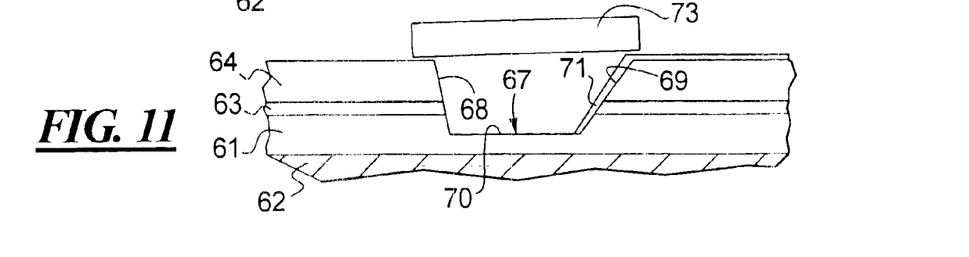

A wet etch process is carried out to remove the remaining portions of the metal layer 71 as shown in FIG. 10. A strip resist process is then carried out to remove the patterned resist layer 72 to expose the portion of the metal layer 71 covering the distal wall 69 as shown in FIG. 10. Then, a detector or emitter 73 is then placed over the trench 67 to receive light transmitted through the core 63, across the trench 67 where it engages the metal layer 71 covering the distal wall 69 where it is reflected upward to the detector 73 shown in FIG. 11.

Figure 12:
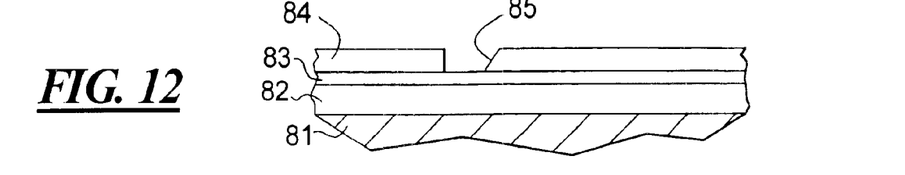
FIGS. 12–14 are sectional views illustrating another process for fabricating a combination waveguide and detector in accordance with this disclosure.
Figure 13:
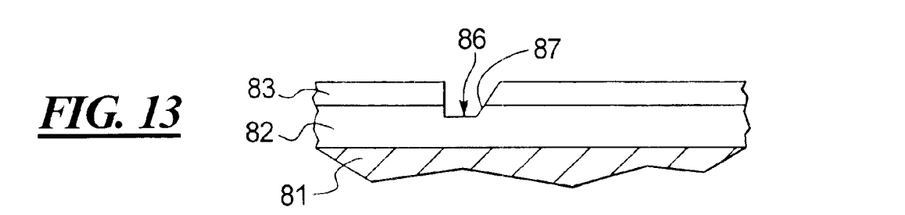
Figure 14:
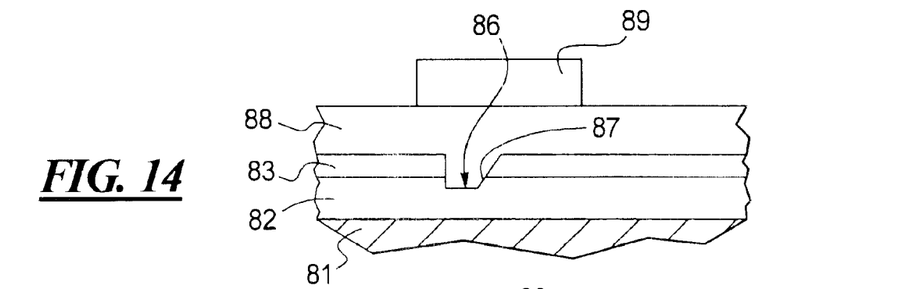

A simplified process is illustrated in FIGS. 12–14. Similar to the embodiments illustrated in FIGS. 1, 5 and 6–10, a substrate 81 is covered with a lower cladding 82 which, in turn, is covered with a core layer 83. In contrast to the embodiments described above, however, a patterned resist 84 is deposited on the core 83. The patterned resist 84 has a tapered or slanted wall portion 85 as shown in FIG. 12. A dry etch process is carried out to produce the trench 86 as shown in FIG. 13 having a slanted distal wall 87. An upper cladding 88 is then deposited on the entire structure and a detector or emitter 89 is mounted on top of the upper cladding 88 which is in a position to receive light reflected upward off of the slanted distal wall 87 as shown in FIG. 14. The process illustrated in FIGS. 12–14 requires no additional masks or process steps and further requires no metallization steps.

Figure 15:
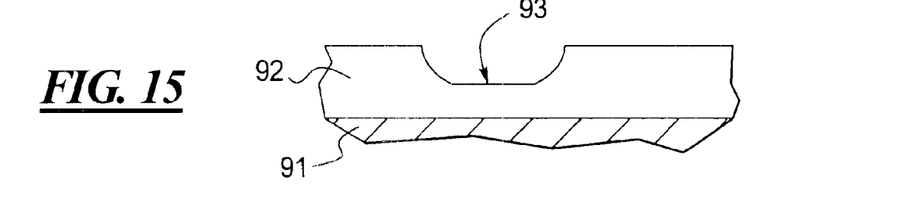
FIGS. 15–17 are sectional views illustrating yet another process for fabricating a combination waveguide and detector in accordance with this disclosure.
Figure 16:
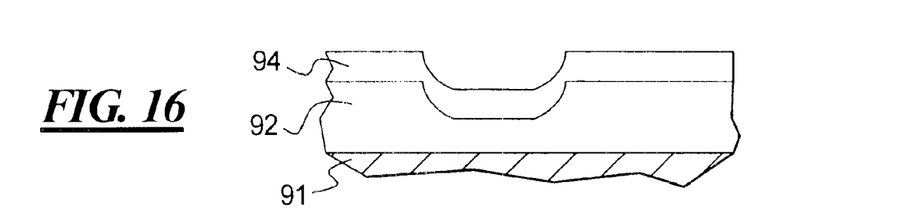
Figure 17:
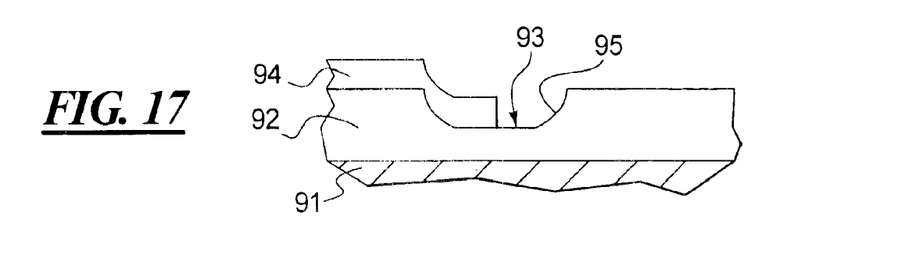
Figure 18:
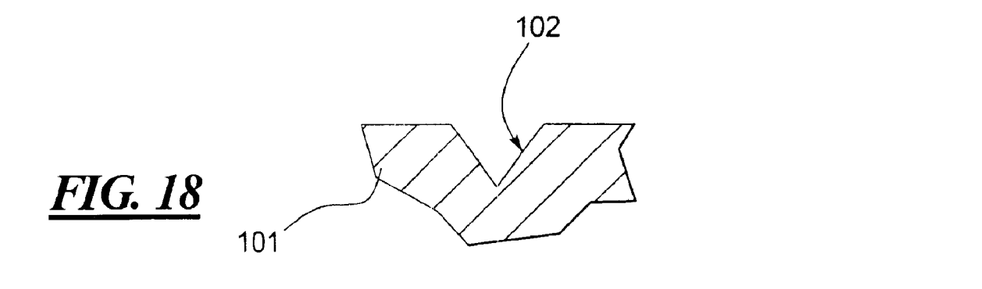
FIGS. 18–21 are sectional views illustrating yet another method for fabricating a combination waveguide and detector in accordance with this disclosure.

Another alternative process is illustrated in FIGS. 15–17. Specifically, a substrate 91 is coated with a lower cladding 92. Then, similar to the process step illustrated in FIG. 11, a tapered photoresist is disposed on the lower cladding 92 and a dry/wet etch is carried out to create the bowl-shaped trench 93 shown in FIG. 15. Then, a core layer 94 is deposited on the entire structure to create the shaped core 94 shown in FIG. 16. Then, a proximal portion of the core is covered with a resist pattern (not shown) and a dry etch is carried out to remove the portion of the core covering the distal wall 95 of the trench 93 as shown in FIG. 17. Then, an upper cladding (not shown) and detector (not shown) may be added to the structure in a fashion similar to that discussed above with respect to FIG. 14. Also, the distal wall 95 may be metallized using the processed discussed above with respect to FIGS. 6–11.

Figure 19:
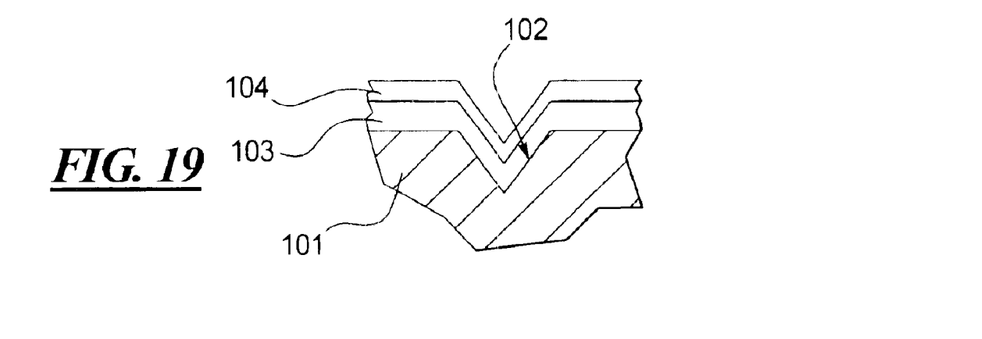
Figure 20:
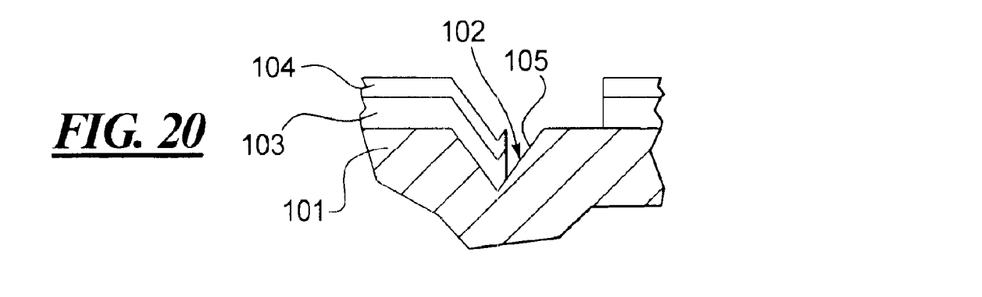
Figure 21:
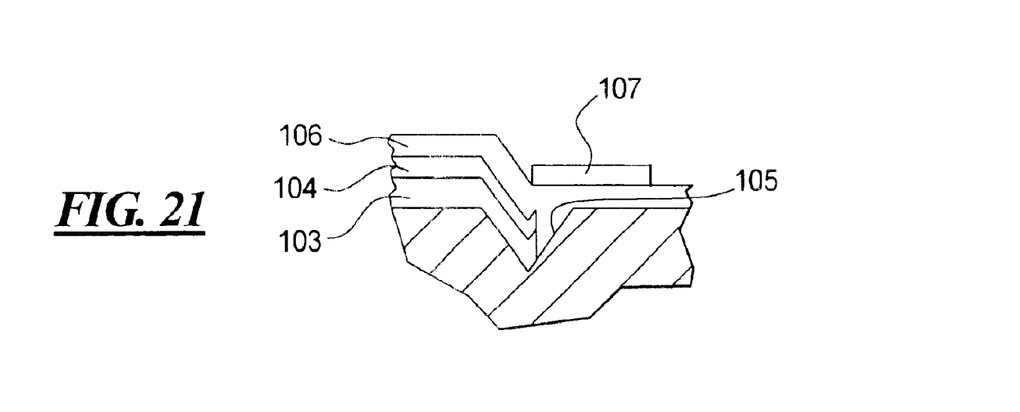

Yet another process is illustrated in FIGS. 18–21. As shown in FIG. 19, a substrate with a v-shaped trench is provided or the v-shaped trench 102 is created using known silicon etching techniques or photoresist patterning. Then, as shown in FIG. 19, a lower cladding 103 and core layer 104 are deposited sequentially on the substrate 101 and in trench 102. The core 104 and lower cladding 103 are then dry etched using the techniques described above and then the exposed distal wall 105 of the trench 102 is then metallized, preferably by photo-plating as shown in FIG. 20. Then, an upper cladding 106 is deposited on the entire structure and a detector or emitter 107 is mounted on the upper cladding 106 above the angled, metallized distal wall 105 of the trench 102 as shown in FIG. 21.

Figure 22:
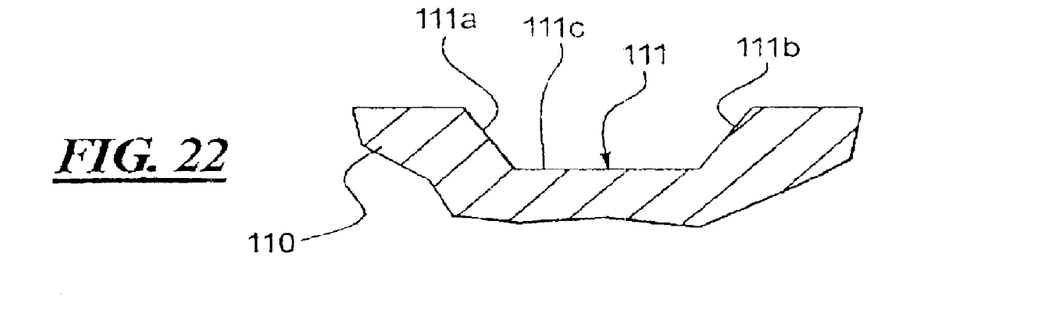
FIGS. 22–25 are sectional views illustrating yet another method for fabricating a combination waveguide and disclosure in accordance with this disclosure.
Figure 23:
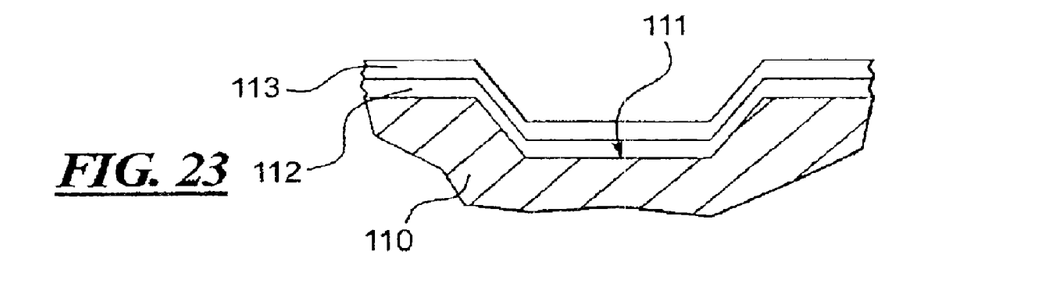
Figure 24:
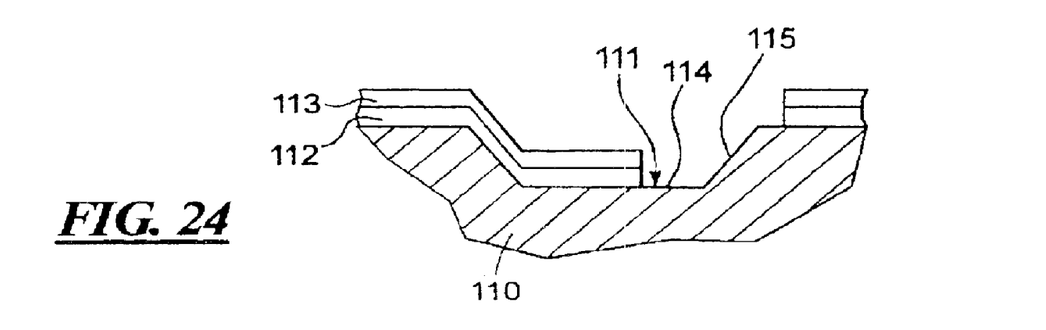
Figure 25:
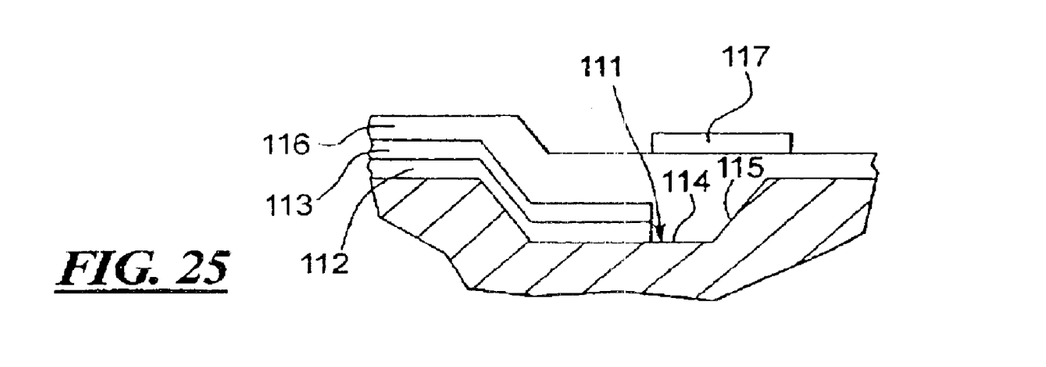

Finally, another manufacturing method is disclosed in FIGS. 22–25. A substrate 110 is provided with an angled trench 111 disposed therein. More specifically as shown in FIG. 22, the trench 111 has two asymmetric walls 111a, 111b wherein the wall 111a extends upward from the bottom 111c of the trench 111 at an angle of about 135° (although this angle may vary by as much as +/−20°) while the wall 111b extends upward from the bottom 111c at an angle of about 45° (although this angle may vary by as much as +/−20°). The angled trench 111 can be created using any of a variety of known silicon etching or photoresist patterning techniques, including those disclosed above. As shown in FIG. 23, a lower cladding 112 is deposited on the substrate 110 and a core layer 113 is deposited on the lower cladding 112. As shown in FIG. 24, a structure is then dry-etched and metallized as discussed above with respect to FIG. 20 to coat a portion of the bottom wall 114 and then distal angled wall 115 of the trench 111 with a metal coating. Then, an upper cladding 116 is deposited on the entire structure and a detector or emitter 117 is mounted over the angled, metallized distal wall 115 as shown in FIG. 25.

Thus, a plurality of waveguides or planar lightwave circuits are disclosed with optical power monitoring or optical detectors. Further, an evanescent coupler is also disclosed with power monitoring or optical detection capabilities. The power monitoring or optical detection capabilities of the disclosed devices are applicable to variable optical attenuators, arrayed waveguide gratings and other optical devices. Further, numerous manufacturing techniques for producing the disclosed devices are also shown and described.

In the foregoing detailed description, the disclosed structures and manufacturing methods have been described with reference exemplary embodiments. It will, however, be evident that various modifications and changes may be made thereto without departing from the broader spirit and scope of this disclosure. The above specification and figures accordingly are to be regarded as illustrated rather than restrictive. Particular materials selected herein can be easily substituted for other materials that will be apparent to those skilled in the art and would nevertheless remain equivalent embodiments of the disclosed devices and manufacturing methods.

What is claimed is:

1. A waveguide comprising:
   a lower cladding,
   a first core disposed on the lower cladding,
   an upper cladding disposed on the first core,
   the lower cladding, first core and upper cladding terminating at a trench and defining a proximal wall of the trench,
   the trench further comprising a distal wall comprising a reflective surface disposed at an angle relative to the first core of greater than 90°,
   the trench further comprising a bottom surface, and the reflective surface and at least part of the bottom surface are coated with a reflective coating forming a concave meniscus on the reflective surface and said at least part of the bottom surface.

2. The waveguide of claim 1 wherein the reflective surface comprises a reflective coating selected from the group consisting of epoxy, solder, eutectic, metal and combinations thereof.

3. The waveguide of claim 2 wherein the reflective coating comprises a layer of epoxy coated with metal.

4. The waveguide of claim 1 further comprising a detector or emitter disposed on top of the upper cladding and the trench.

5. The waveguide of claim 3 wherein the detector or emitter is an InGaAs photodetector.

6. The waveguide of claim 3 wherein the detector or emitter is an array of InGaAs photodetectors.

7. The waveguide of claim 1 wherein the lower cladding is disposed on a planar substrate.

8. The waveguide of claim 1 wherein the lower cladding is disposed on a substrate and the trench is disposed in the substrate.

9. The waveguide of claim 1 wherein the meniscus provides an angle of reflection with respect to the first core of less than 90°.

10. The waveguide of claim 1 wherein the reflective coating comprises a layer of epoxy coated with metal.

11. The waveguide of claim 1 further comprising a second core extending through the lower cladding and below the trench, the second core receiving an input signal and the first core serving as an evanescent coupler.

12. The waveguide of claim 1 wherein the proximal wall of the trench is perpendicular to a longitudinal axis of the core.

13. The waveguide of claim 1 wherein the trench further comprises a bottom surface and the proximal and distal walls of the trench extend upward from the bottom surface and away from each other so that an open top of the trench is wider than a the bottom surface on the trench.

14. The waveguide of claim 1 wherein the trench is v-shaped and wherein the proximal and distal walls of the trench meet at a bottom point of the trench.

15. A waveguide comprising:
    a lower cladding,
    a first core disposed on the lower cladding,
    an upper cladding disposed on the first core,
    the lower cladding, first core and upper cladding terminating at a trench and defining a proximal wall of the trench,
    the trench further comprising a distal wall comprising a reflective surface disposed at an angle relative to the first core of greater than 90°,
    a second core extending through the lower cladding and below the trench, the second core receiving an input signal and the first core serving as an evanescent coupler.

16. The waveguide of claim 15 wherein the reflective surface comprises a reflective coating selected from the group consisting of epoxy, solder, eutectic, metal and combinations thereof.

17. The waveguide of claim 16 wherein the reflective coating comprises a layer of epoxy coated with metal.

18. The waveguide of claim 15 further comprising a detector or an emitter disposed on top of the upper cladding and the trench.

19. The waveguide of claim 18 wherein the detector or emitter is an InGaAs photodetector.

20. The waveguide of claim 18 wherein the detector or emitter is an array of InGaAs photodetectors.

21. The waveguide of claim 15 wherein the lower cladding is disposed on a planar substrate.

22. The waveguide of claim 15 wherein the lower cladding is disposed on a substrate and the trench is disposed in the substrate.

23. The waveguide of claim 15 wherein the trench further comprises a bottom surface, and the reflective surface and at least part of the bottom surface are coated with a reflective coating that forms a concave meniscus on the reflective surface and said at least part of the bottom surface.

24. The waveguide of claim 23 wherein the meniscus provides an angle of reflection with respect to the first core of less than 90°.

25. The waveguide of claim 23 wherein the reflective coating comprises a layer of epoxy coated with metal.

26. The waveguide of claim 15 wherein the proximal wall of the trench is perpendicular to a longitudinal axis of the core.

27. The waveguide of claim 15 wherein the trench further comprises a bottom surface and the proximal and distal walls of the trench extend upward from the bottom surface and away from each other so that an open top of the trench is wider than the bottom surface on the trench.

28. The waveguide of claim 15 wherein the trench is v-shaped and wherein the proximal and distal walls of the trench meet at a bottom point of the trench.

29. A waveguide comprising:
    a lower cladding,
    a first core disposed on the lower cladding,
    an upper cladding disposed on the first core,
    the lower cladding, first core and upper cladding terminating at a trench and defining a proximal wall of the trench,
    the trench further comprising a distal wall comprising a reflective surface disposed at an angle relative to the first core of greater than 90°,
    the trench further comprising a bottom surface extending between the proximal and distal walls of the trench, the proximal and distal walls of the trench extending upward from the bottom surface and away from each other so that an open top of the trench is wider than the bottom surface on the trench.

30. The waveguide of claim 29 wherein the reflective surface comprises a reflective coating selected from the group consisting of epoxy, solder, eutectic, metal and combinations thereof.

31. The waveguide of claim 30 wherein the reflective coating comprises a layer of epoxy coated with metal.

32. The waveguide of claim 29 further comprising a detector or emitter disposed on top of the upper cladding and the trench.

33. The waveguide of claim 32 wherein the detector or emitter is an InGaAs photodetector.

34. The waveguide of claim 32 wherein the detector or emitter is an array of InGaAs photodetectors.

35. The waveguide of claim 29 wherein the lower cladding is disposed on a planar substrate.

36. The waveguide of claim 29 wherein the lower cladding is disposed on a substrate and the trench is disposed in the substrate.

37. The waveguide of claim 29 wherein the trench further comprises a bottom surface, and the reflective surface and at least part of the bottom surface are coated with a reflective coating that forms a concave meniscus on the reflective surface and said at least part of the bottom surface.

38. The waveguide of claim 37 wherein the meniscus provides an angle of reflection with respect to the first core of less than 90°.

39. The waveguide of claim 37 wherein the reflective coating comprises a layer of epoxy coated with metal.

40. The waveguide of claim 29 further comprising a second core extending through the lower cladding and below the trench, the second core receiving an input signal and the first core serving as an evanescent coupler.

41. The waveguide of claim 29 wherein the proximal wall of the trench is perpendicular to a longitudinal axis of the core.

* * * * *

UNITED STATES PATENT AND TRADEMARK OFFICE
CERTIFICATE OF CORRECTION

PATENT NO. : 6,934,455 B2 Page 1 of 1
APPLICATION NO. : 10/329252
DATED : August 23, 2005
INVENTOR(S) : Michael Skinner et al.

It is certified that error appears in the above-identified patent and that said Letters Patent is hereby corrected as shown below:

In the Claims:

At Column 7, line 57, "than a the bottom" should be -- than the bottom --.

Signed and Sealed this

Eleventh Day of September, 2007

JON W. DUDAS
*Director of the United States Patent and Trademark Office*